May 16, 1967  W. MAYA  3,320,147
SYNTHESIS OF TRIFLUORAMINE OXIDE
Filed Nov. 8, 1962
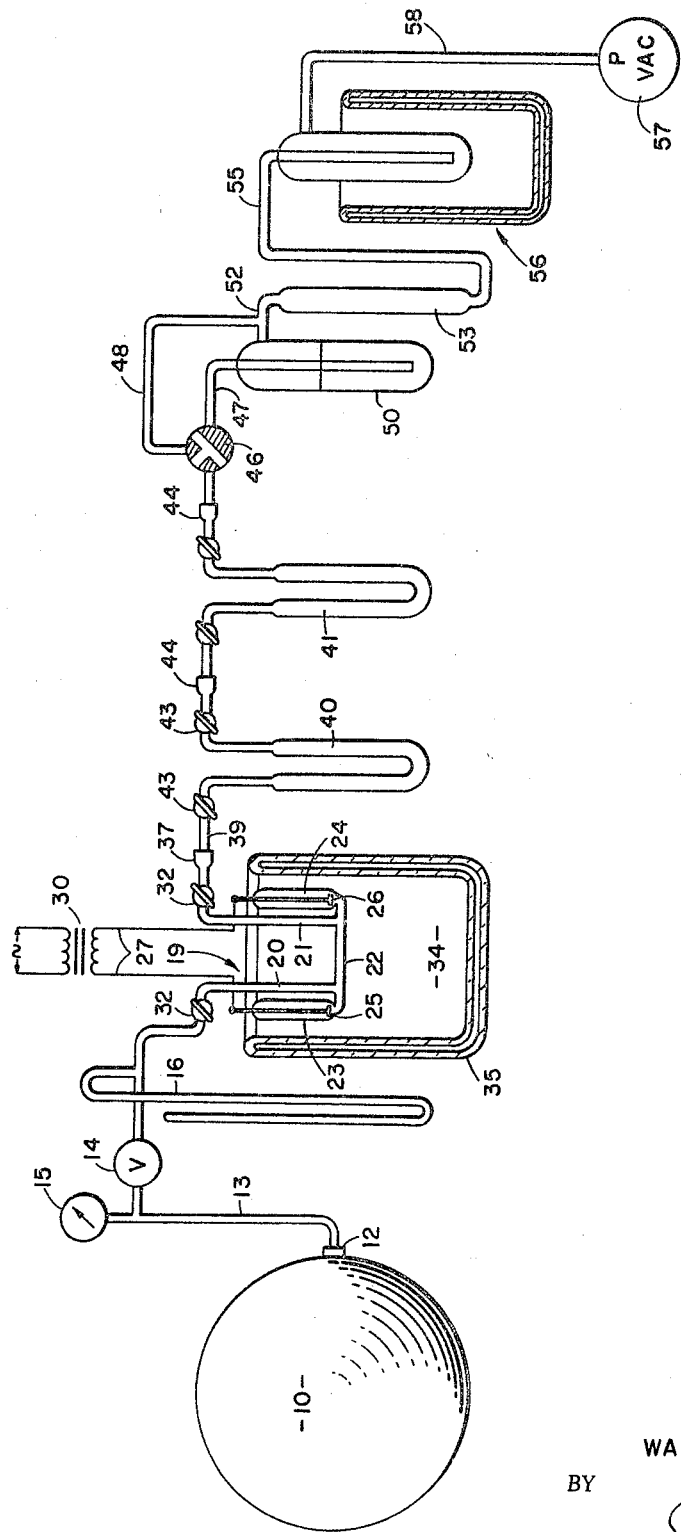
INVENTOR.
WALTER MAYA
BY
J. M. Dubiel
ATTORNEY 3,320,147
SYNTHESIS OF TRIFLUORAMINE OXIDE
Walter Maya, West Los Angeles, Calif., assignor to
North American Aviation, Inc.
Filed Nov. 8, 1962, Ser. No. 236,210
8 Claims. (Cl. 204—177)

This invention relates to synthesis of trifluoramine oxide from mixtures of nitrogen, fluorine and oxygen, and from mixtures of fluorine and binary compounds of nitrogen and oxygen.

The chemical formula for trifluoramine oxide is $NF_3O$. Its molecular weight is 87. It has a melting point of $-161.5° \pm 1.0°$ C., and a boiling point of about $-89°$ C. calculated from vapor pressure data. It is thermally stable to about 300° C. Its prominent adsorptions in the infrared spectrum lie at $6.0\mu$ and $11.2\mu$. Reduction by acidified potassium iodide solution gives a value of three equivalents per mole of trifluoramine oxide.

Trifluoramine oxide is an extremely high energy oxidizer and finds utility in the field of liquid rocket propellants. Also, it is useful as an intermediate in the preparation of compounds containing nitrogen-to-halogen bonds.

As disclosed in patent application Ser. No. 142,459, filed Sept. 29, 1961, the inventors being Emil A. Lawton and Donald Pilipovich, trifluoramine oxide has been prepared by reacting difluoramine with chlorine trifluoride and an oxygenated halogen compound. The process of synthesizing trifluoramine oxide according to the instant invention has advantages over the process disclosed in said patent application in that the process of this invention is relatively simple and easy to perform, the reactants are inexpensive and more readily available, and the yields are higher.

The reactants for the process of this invention may be two or three in number. In the case of three reactants, they are nitrogen, fluorine and oxygen. In a preferred embodiment, a supply of the reactants is had by mixing air with fluorine, air being preferred for supplying the nitrogen and oxygen constituents because of its minimal cost. In the case of two reactants, the two reactants are fluorine and at least one binary compound of nitrogen and oxygen (i.e. $N_2O$, $NO$, and $NO_2$) with nitrogen dioxide being the preferred binary compound because it is relatively inexpensive and easy to handle.

In the process of this invention the reactants are caused to become excited, i.e. an electron of each of the reactants passes from its normal orbit to one of higher energy as a result of the absorption of radiations. While the excited substances are in their excited states, they are quenched to a lower state or to ground state, the result of the excitation and quenching being the formation of trifluoramine oxide and other binary and tertiary compounds of nitrogen, fluorine and oxygen, as well as the reactants themselves. Conjecturing, it seems more likely that the trifluoramine oxide exists in the reaction zone before quenching than that the trifluoramine oxide is formed only upon or through quenching of the excited reactants. It is theorized that the excited nitrogen, fluorine and oxygen become involved in numerous and simultaneous reversible reactions with the trifluoramine oxide and other binary and tertiary compounds of nitrogen, fluorine and oxygen, and that quenching freezes (used in its figurative sense of making immobile or inflexible) the reaction.

If the quenching operation is quick the yield of trifluoramine oxide is increased. If the quenching operation is slow, the yield of trifluoramine oxide is decreased and that of other less thermally stable compounds, FNO and $FNO_2$, for example, is increased. Rapid quenching is most conveniently performed by contacting the reactants and products of the reversible reactions with a cold surface while the reactants are in their excited states, the yield of trifluoramine oxide increasing with the degree of coldness. From a practical standpoint, the contacting surface should be at sub-zero temperature, and preferably at a cryogenic temperature, i.e. $-78°$ C. and colder.

The use of any electrical discharge means for effecting excitation of the reactants is contemplated by this invention, e.g. Corona discharge, ozonizer, and high-frequency Tesla coil. Convenience of operation in a laboratory is had by the use of a glow discharge cell.

So long as the quenching is rapid enough to provide a satisfactory yield of trifluoramine oxide, the excitation of the reactants may be performed at any temperature below the temperature at which trifluoramine oxide is thermally unstable.

The factor of criticality for this invention is to effect quenching preferably as quick as possible, while the reactants are in their excited states. Quenching at cryogenic temperatures is quicker than at higher temperatures. The interval of time between excitation and decay to ground state is but a minute fraction of a second (of the order of about $10^{-7}$) and one reactant may pass from the excited state to ground state before another. It develops, therefore, that as the space between the quenching means and the excitation source increases, it is necessary to flow the reactants faster in order to effect quenching in time to produce a satisfactory yield. From a practical standpoint then, such an excitation source should be used which is adapted to be combined with a quenching means at close proximity.

Another variable to be considered as having an effect on the process of this invention is that of relative concentrations of the reactants. The use of stoichiometrical proportions of the reactants suggests itself; but from a purely qualitative standpoint, distinct from quantitative considerations, the fact of formation of trifluoramine oxide exists irrespective of the relative concentrations of the reactants.

Another facet of the matter of concentrations of reactants is that of including other constituents in the mixture of reactants. Obviously, such contaminants which through combination with fluorine form corrosive products should be avoided. As to inert constituents in the mixture of reactants, e.g. helium, this is a parameter which, because of mass action principles, affects the reactions of this invention quantitatively but not qualitatively.

The invention is hereinafter illustrated by description with reference to the accompanying drawings, the single figure of which is a diagrammatic representation of a suitable laboratory apparatus employing a glow discharge cell for the synthesis of trifluoramine oxide according to the process of this invention.

In the drawing, reference numeral 10 designates a 60 liter stainless steel tank filled with a mixture of the reactants, e.g. air and fluorine, at atmospheric pressure. The tank has an outlet 12 connected by a flow line 13 which is regulated by a needle valve 14. Upstream of the needle valve is a pressure gauge 15 and downstream of the needle valve is a manometer 16.

The glow discharge cell is designated generally by numeral 19. It comprises a glass U-tube of two legs 20 and 21 interconnected by a straight base portion 22. The ends of the base portion are open to bulbs 23 and 24 having electrodes 25 and 26, respectively, which are connected by leads 27 across an electric power source 30, e.g. a 15 kv., 30 ma. luminous tube transformer. Each U-tube leg has a stopcock 32 at its upper end. The glow discharge cell is arranged to extend into a cryogenic bath 34, e.g. liquid nitrogen, contained in a Dewar flask 35.

A train of U-tube traps is connected to the downstream end of the glow discharge cell at a glass-tube coupling 37. The train comprises a flow line 39 connecting first and second U-tube traps 40 and 41 in series. The flow line 39 also includes a plurality of stopcocks 43 and tube couplings 44 permitting isolation and disconnection of the traps. Connected at the downstream end of the train of traps is a two-way valve 46 connected to two branch lines 47 and 48. Branch line 47 leads to a long bubbler manostat 50 containing "Fluorolube" oil. The outlet of the manostate is connected by flow line 52 to a fluorine absorber 53 containing salt and lime. Flow line 55 connects the absorber to a cold trap 56 for protecting a vacuum pump 57 which is connected to the outlet of the cold trap 56 by flow line 58.

For operation, the suction pump 57 and the power source 30 are energized and the needle valve 14 is adjusted to provide a suitable pressure, e.g. 50 mm. of mercury as measured by the manometer 16, of the reactant gases being introduced to the discharge cell 19. The pressure in the cell is regulated by the manostat 50. After a suitable time period of operation, e.g. 2 hours, the transformer 30 is deenergized and the needle valve 14 is closed. The apparatus is then prepared to below 1 mm. pressure by adjusting the two-way valve 46 to by-pass the manostat 50 whereby evacuation is effected through the branch line 48. The first trap 40 is cooled by immersion in a cryogenic bath, e.g., $-142°$ C. with a slush bath of methylcyclopentane, and the second trap 41 is cooled as to $-196°$ C. by immersion in a bath of liquid nitrogen. The Dewar flask 35 is then removed to allow the discharge cell 19 to a warm up to room temperature. By the time the temperature of the discharge cell reaches room temperature a red deposit will have formed on the inside of the first trap 40 and a whitish deposit will have formed on the inside of the second trap 41. The traps 40 and 41 are then isolated from each other under vacuum by closing of the stopcocks 43 and making disconnections at the couplings 44.

The contents of the second trap 41 are then subjected to fractional distillation under high vacuum in a system (not shown) of two traps, the first being cooled to $-183°$ C. by immersion in a liquid oxygen bath and the second being cooled to $-196$ C. by immersion in liquid nitrogen. Upon analysis it will be found that the contents of the first trap of the fractional distillation system consists essentially of $NF_3O$.

The following table sets forth particulars of operating conditions for different examples of practice of the process of the invention using the apparatus described above.

With a glow discharge, the pressure at which the reaction is run has an influence on the yield. For a glow discharge cell connected to a power source of a given voltage capacity, it was found that pressures below 50 mm. of mercury tend to decrease the amount of trifluoramine oxide formed while higher pressures do not significantly increase the yield. The consequence of increased yield with increased pressures is reasonable because of mass action principles. With respect to the result of no substantial increase in yield as pressures are increased above about 50 mm., this occurs because, in a glow discharge cell, the discharge becomes more concentrated, changing from a diffused glow to more of a thin continuous spark whereby the zone of excitation is decreased in cross-sectional size.

For operation with a glow discharge cell it was found that variations in electrode separation have the same effect as variations in pressure, but only because of the resulting changes in the nature of the electrical discharge. With respect to Example No. 2 in the above table a discharge cell in which the legs 20 and 21 were spaced apart by 8 centimeters was used whereas a discharge cell of an effective base portion length 22 of 5 centimeters was used in the remaining examples. If the electrodes are too far apart for the particular voltage impressed across them, no glow discharge will be established.

With respect to the rate of flow of the reactants, if, for a given set of conditions for operation of the cell, i.e. pressure, voltage and electrode spacing, the reactant gases are passed into the cell at too high a rate, they will cause the discharge to be blown out. For the illustrated apparatus and operating the transformer at 15 kv., 30 ma., it was found that if the reactants are passed through the apparatus at a rate greater than about 3 liters per hour, then the glow discharge would be blown out. For the examples listed in the above table a flow rate of from about 2 to 3 liters per hour was used. Any suitable flow rate is contemplated by this invention, a slow flow rate requiring a longer time for obtaining an appreciable yield.

The process of this invention may be performed at atmospheric pressure so long as quenching is effected while the reactants are in their excited states. In the illustrated apparatus, the legs 20 and 21 of the discharge cell extend into the cryogenic bath 34, whereby the quenching surfaces (inside surfaces of legs 20 and 21) are positioned close to the reaction zone of the straight base portion 22. During the operation, it is noticeable that the light of the glow discharge extends up into the legs 20 and 21 of the discharge cell.

In view of the foregoing it is clear that the factors of pressure, voltage, electrode spacing, and flow rates of reactants, as variables affecting the efficiency of operation of the process of this invention, are of significance only when considering the particular type of excitation means to be employed, and therefore these variables are not matters of criticality to this invention.

| Ex. No. | Reactants | Percent composition | Pressure as registered by manometer 16, mm. | Bath 34 | Yield in percent |
|---|---|---|---|---|---|
| 1 | Air | 50 | 60 | Liquid $N_2$ $-196°$ C | 25 |
|   | Fluorine | 50 |  |  |  |
| 2 | Air | 50 | 50 | Liquid $N_2$ | 17 |
|   | Fluorine | 50 |  |  |  |
| 3 | Fluorine | 60 | 50 | ___do___ | 20 |
|   | Nitrogen | 20 |  |  |  |
|   | Oxygen | 20 |  |  |  |
| 4 | Air | 50 | 10 | ___do___ | 10 |
|   | Fluorine | 50 |  |  |  |
| 5 | Air | 30 | 20 | Liquid $O_2$ $-183°$ C | 15 |
|   | Fluorine | 70 |  |  |  |
| 6 | Air | 70 | 50 | Dry Ice $-78°$ C | 10 |
|   | Fluorine | 30 |  |  |  |

The yields of $NF_3O$ listed in the last column of the table were calculated as percent by weight based on the amount of oxygen which was calculated to have passed into the discharge cell.

It will be understood that it is intended to cover all changes and modifications of the examples of the invention herein chosen for purposes of the disclosure, which do not constitute departures from the spirit and scope of the invention.

Having described the invention, what is claimed is:

1. The process of synthesizing trifluoramine oxide comprising the steps of preparing a supply of gases comprising from two to three reactants; when the number of said reactants is three, the reactants are nitrogen, fluorine and oxygen, and when the number of said reactants is two, one of said two reactants is fluorine and the other of said two reactants is a binary compound of nitrogen and oxygen; subjecting said reactants to an electrical discharge to excite said reactants whereby an electron of each of the reactants passes from its normal orbit to one of higher energy as a result of the absorption of radiation; quenching the excited reactants to a temperature below that at which trifluoramine oxide is unstable, trifluoramine oxide being formed as a result of said exciting and quenching steps, and collecting the trifluoramine oxide.

2. A process for synthesizing trifluoramine oxide comprising the steps of preparing a supply of gases, said supply comprising a mixture of reactants, said mixture being a member of the group consisting of (1) nitrogen, fluorine and oxygen, and (2) fluorine and at least one binary compound of nitrogen and oxygen; subjecting said mixture to an electrical discharge to excite said reactants whereby an electron of each of the reactants passes from its normal orbit to one of higher energy as a result of the absorption of radiation; quenching the excited reactants to a temperature below that at which trifluoramine oxide is unstable, trifluoramine oxide being formed as a result of said exciting and quenching steps, and collecting trifluoramine oxide.

3. The process of claim 2 in which said mixture consists essentially of air and fluorine.

4. The process of claim 2 in which said reactants are fluorine and nitrogen dioxide.

5. The process of claim 2 in which said quenching is effected by contacting the excited substances with a surface at sub-zero temperature.

6. The process of claim 5 in which said sub-zero temperature is cryogenic.

7. A process for synthesizing trifluoramine oxide comprising the steps of passing a glow discharge through a mixture of air and fluorine, thereby to excite the fluorine and the nitrogen and oxygen of the air, and while said fluorine, nitrogen and oxygen are in an excited state contacting them with a cooled surface at a cryogenic temperature, thereby to quench the excited fluorine, nitrogen and oxygen with trifluoramine oxide and other compounds being formed, said other compounds comprising binary compounds of nitrogen and oxygen, and separating the trifluoramine oxide from said other compounds.

8. The process of claim 7 in which the separating step is effected by fractional vacuum condensation.

References Cited by the Examiner

UNITED STATES PATENTS 3,043,662   7/1962   Lipscomb _____ 23—203

OTHER REFERENCES

Hackh's Chemical Dictionary, 3rd edition (1944), The Blakiston Co., page 328.

JOHN H. MACK, *Primary Examiner.*

CARL D. QUARFORTH, *Examiner.*

J. D. VOIGHT, H. S. WILLIAMS, *Assistant Examiners.*